US012598486B2

(12) United States Patent
Baliarsingh

(10) Patent No.: US 12,598,486 B2
(45) Date of Patent: Apr. 7, 2026

(54) METHODS AND APPARATUS FOR MANAGING RAN NODES IN A COMMUNICATION NETWORK

(71) Applicant: Samsung Electronics Co., Ltd., Suwon-si (KR)

(72) Inventor: Saubhagya Baliarsingh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1013 days.

(21) Appl. No.: 17/714,551

(22) Filed: Apr. 6, 2022

(65) Prior Publication Data

US 2022/0330054 A1 Oct. 13, 2022

Related U.S. Application Data

(63) Continuation of application No. PCT/KR2022/004862, filed on Apr. 5, 2022.

(30) Foreign Application Priority Data

Apr. 9, 2021 (IN) .............................. 202141016784
Oct. 8, 2021 (IN) .............................. 2021 41016784

(51) Int. Cl.
*H04W 24/04* (2009.01)
(52) U.S. Cl.
CPC .................................... *H04W 24/04* (2013.01)
(58) Field of Classification Search
CPC ....... H04W 24/04; H04W 8/30; H04W 36/00; H04W 4/02; H04W 28/0226; H04L 41/0654; H04B 1/74
See application file for complete search history.

(56) References Cited

U.S. PATENT DOCUMENTS

2020/0187144 A1    6/2020 Ying et al.
2020/0267049 A1*   8/2020 Suryanarayanarao ......................
                                                        H04W 24/04
(Continued)

FOREIGN PATENT DOCUMENTS

CN     111417151 A    7/2020
CN     113950000 A    1/2022
KR     10-2352113 B1  1/2022

OTHER PUBLICATIONS

Huawei et al., Supported RATs of the AMF, R3-211193, 3GPP TSG-RAN WG3 Meeting #111-e, Feb. 5, 2021, E-meeting.
(Continued)

*Primary Examiner* — Brian T Le
(74) *Attorney, Agent, or Firm* — Jefferson IP Law, LLP

(57) ABSTRACT

The disclosure relates to a pre-5$^{th}$-generation (5G) or 5G communication system to be provided for supporting higher data rates Beyond 4th-generation (4G) communication system, such as long term evolution (LTE). A method and an apparatus for managing radio access network (RAN) nodes in a communication network are provided. The method includes receiving tracking area identity (TAI) indicating locality, from added RAN nodes, determining whether locality of RAN nodes corresponds to primary or secondary serving localities of access and mobility management function (AMF), based on pre-stored TAI list, identifying relative AMF capacity (RAC) value for RAN nodes and transmitting RAC value to RAN nodes. The disclosure relates to method and AMF for notifying status of AMFs to RAN nodes, comprising transmitting request including identifier of AMF set, to network repository function (NRF) server, receiving notification indicating status of other AMFs in AMF set, from NRF server and notifying status of at least one AMF (Continued)

100

103

107

UE 101 — RAN NODE 102₁ — RAN NODE 105₁₁

RAN NODE 102₂

RAN NODE 102ₙ

108

RAN NODE 105₁₁   AMF 105₂₁   AMF 105ₙ₁
AMF 105₁₂  106₁   AMF 105₂₂  106₂   AMF 105ₙ₂  106ₙ
AMF 105₁ₙ   AMF 105₂ₙ   AMF 105ₙₙ

104₁    104₂    104ₙ from other AMFs to RAN nodes associated with at least one AMF, when status is one of pre-defined status.

12 Claims, 9 Drawing Sheets

(56) References Cited

U.S. PATENT DOCUMENTS

| | | |
|---|---|---|
| 2020/0404480 A1 | 12/2020 | Zhu et al. |
| 2021/0084582 A1 | 3/2021 | Li |
| 2021/0306875 A1 | 9/2021 | Zhang |
| 2022/0110086 A1* | 4/2022 | Singh ................... H04W 48/18 |

OTHER PUBLICATIONS

3GPP; TSG RAN; NG-RAN; NG Application Protocol (NGAP) (Release 16), 3GPP TS 38.413 V16.4.0 (Jan. 2021), Jan. 4, 2021, Sophia Antipolis, France.

3GPP; TSG SA; 5GS; Stage 2 (Release 17), 3GPP TS 23.501 V17.0.0 (Mar. 2021), Mar. 30, 2021, Sophia Antipolis, France.

ZTE et al., Max number of supported AMF Regions exceeded at NG-RAN node, R3-210571, 3GPP TSG-RAN WG3 #111-e, Jan. 14, 2021, Online.

International Search Report dated Jul. 8, 2022, issued in International Application No. PCT/KR2022/004862.

Indian Office Action dated Nov. 22, 2022, issued in an Indian Patent Application No. 202141016784.

* cited by examiner

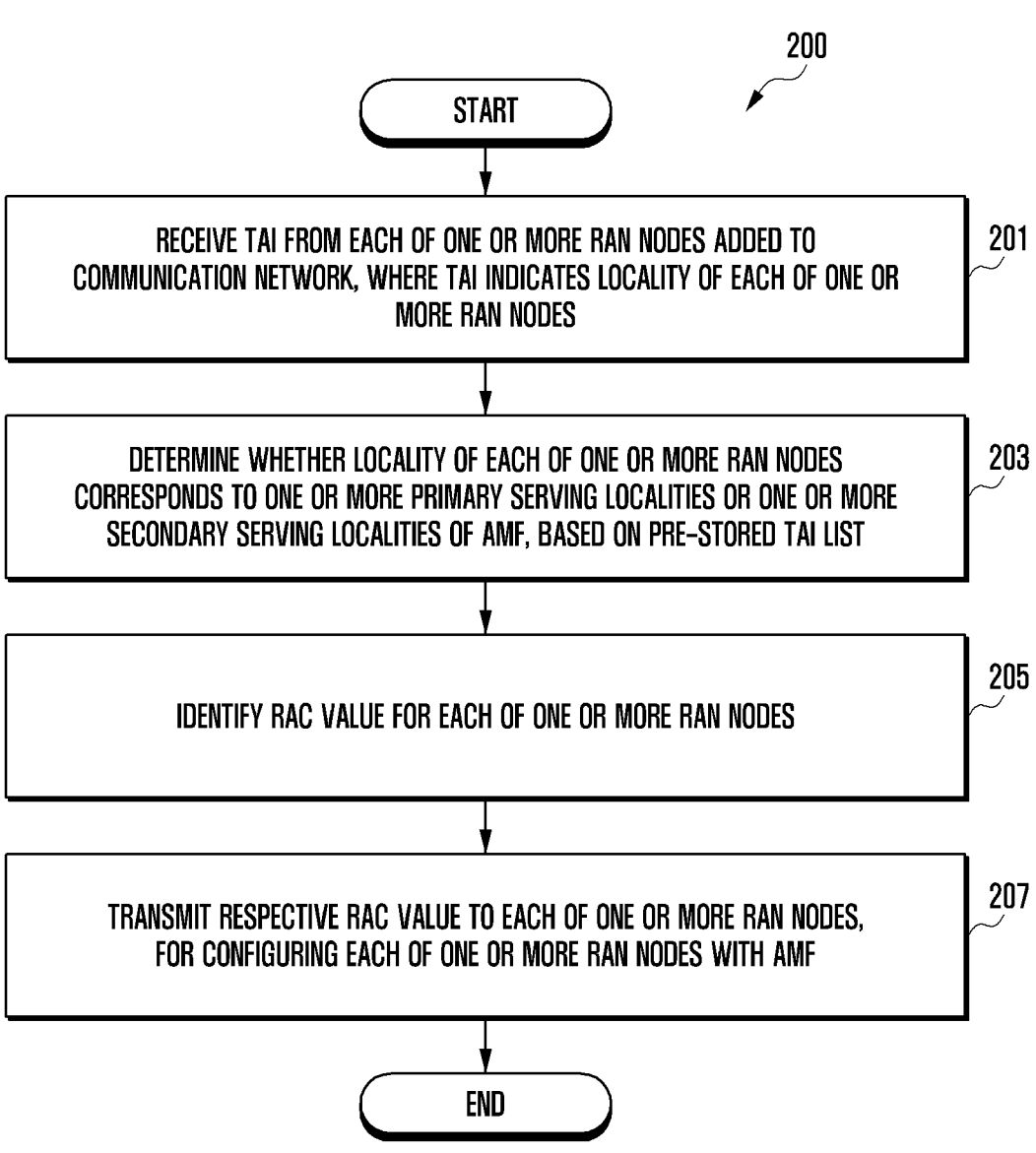

200

START

RECEIVE TAI FROM EACH OF ONE OR MORE RAN NODES ADDED TO COMMUNICATION NETWORK, WHERE TAI INDICATES LOCALITY OF EACH OF ONE OR MORE RAN NODES    201

DETERMINE WHETHER LOCALITY OF EACH OF ONE OR MORE RAN NODES CORRESPONDS TO ONE OR MORE PRIMARY SERVING LOCALITIES OR ONE OR MORE SECONDARY SERVING LOCALITIES OF AMF, BASED ON PRE-STORED TAI LIST    203

IDENTIFY RAC VALUE FOR EACH OF ONE OR MORE RAN NODES    205

TRANSMIT RESPECTIVE RAC VALUE TO EACH OF ONE OR MORE RAN NODES, FOR CONFIGURING EACH OF ONE OR MORE RAN NODES WITH AMF    207

END

METHODS AND APPARATUS FOR MANAGING RAN NODES IN A COMMUNICATION NETWORK

CROSS-REFERENCE TO RELATED APPLICATION(S)

This application is a continuation application, claiming priority under § 365(c), of an International application No. PCT/KR2022/004862, filed on Apr. 5, 2022, which is based on and claims the benefit of an Indian provisional patent application number 202141016784, filed on Apr. 9, 2021, in the Indian Patent Office, and of an Indian Complete patent application number 202141016784, filed on Oct. 8, 2021, in the Indian Patent Office, the disclosure of each of which is incorporated by reference herein in its entirety.

BACKGROUND

1. Field

The disclosure relates to telecommunication. More particularly, the disclosure relates to methods and apparatus for managing radio access network (RAN) nodes in a communication network.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Access and mobility management function (AMF) manages connection and mobility management for user equipment (UEs) in communication networks. In a cloud native design principle, an AMF region comprises multiple sets of AMFs to provide high level of redundancy. This design of AMF region is generally termed as geo-redundancy AMF region. The AMFs in each AMF set are configured with radio access network (RAN) nodes to process context of the UEs. Currently, the AMF is manually configured using identifier of RAN nodes and relative AMF capacity (RAC) value. The RAC value helps in load balancing traffic across the multiple AMFs. The configuration of the RAN nodes includes mapping the identifier of RAN nodes and RAC values for each AMFs. This configuration is installed in the corresponding AMF before the RAN node contacts the AMF for processing context of the UEs. Generally, this manual configuration is a lengthy list and is erroneous. Further, the RAN nodes can change their locality (cell Identity (ID)s/tracking areas) at any point of time. All the AMFs have to be reconfigured, when a RAN node is added or removed, thus leading multiple public land mobile network (PLMN) flexibility to be compromised. It is difficult for each PLMN to enable or disable the AMFs independently.

The AMFs in an AMF set are interchangeable. i.e., any AMF can handle context of a UE that belongs to the AMF set. This ensures that there is no single point of failure when an AMF fails or when the AMF is removed. The AMF failure or removal is detected via network repository function (NRF) heartbeat mechanism. A NRF server receives packets from the AMFs indicating that the AMFs are in operating condition. The failure or removal of the AMFs is detected when the NRF server does not receive the packets. Hence, the NRF server detects the failure or removal of the AMFs. However, the RAN nodes do not have access to the NRF server, in the existing systems. The RAN nodes detect failure of the AMFs by sending messages to the AMFs and waiting for timeout for all retry attempts. This is a time-consuming process. Further, the RAN nodes perform the same cycle for all the UEs connected via the RAN node. In some existing systems, failure, removal, or addition of the AMFs is notified via operations, administration and maintenance (OAM). However, when the AMF and the RAN node belongs to different operator with different OAM domain, coordination between the operators to manage the RAN nodes on failure, removal, or addition of the AMFs is difficult. Hence, there is a need to overcome one or more limitations of the above-described systems to enhance the geo-redundancy AMF region.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an Access and mobility management function (AMF) in a communication network.

Additional aspects will be set forth in part in the description which follows and, in part, will be apparent from the description, or may be learned by practice of the presented embodiments.

In accordance with an aspect of the disclosure, a method for managing radio access network (RAN) nodes in a communication network is provided. The method is performed by an access and mobility management function (AMF) from one or more AMFs of an AMF set. The method includes receiving a tracking area identity (TAI) from each of one or more RAN nodes added to the communication network. The TAI indicates a locality of each of the one or more RAN nodes. Further, the method comprises determining whether the locality of each of the one or more RAN nodes corresponds to one of, one or more primary serving localities of the AMF and one or more secondary serving localities of the AMF, based on a pre-stored TAI list. Furthermore, the method comprises identifying a relative AMF capacity (RAC) value for each of the one or more RAN nodes. Thereafter, the method comprises transmitting respective RAC value to each of the one or more RAN nodes, for configuring each of the one or more RAN nodes with the AMF.

In accordance with another aspect of the disclosure, a method for notifying status of access and mobility management functions (AMFs) in a communication network is provided. The method is performed by an AMF from one or more AMFs of an AMF set. The method includes transmitting a request to a network repository function (NRF) server, for status of other AMFs in the AMF set. The status may be one of a pre-defined status indicating failure/removal of the AMF in the AMF set or addition of an AMF to the AMF set. The request comprises an identifier of the AMF set. Further, the method comprises receiving a notification indicating the status of the other AMFs in the AMF set, from the NRF server, in response to the request. Thereafter, the method comprises notifying the status of at least one AMF from the other AMFs in the AMF set to one or more radio access network (RAN) nodes associated with the at least one AMF, when the status of the at least one AMF is one of a pre-defined status.

In accordance with another aspect of the disclosure, an access and mobility management function (AMF) for managing radio access network (RAN) nodes a communication network is provided. The AMF from one or more AMFs of an AMF set includes a processor and a memory. The processor is configured to receive a tracking area identity (TAI) from each of one or more RAN nodes added to the communication network. The TAI indicates a locality of each of the one or more RAN nodes. Further, the processor is configured to determine whether the locality of each of the one or more RAN nodes corresponds to one of, one or more primary serving localities of the AMF and one or more secondary serving localities of the AMF, based on a pre-stored TAI list. Furthermore, the processor is configured to identify a relative AMF capacity (RAC) value for each of the one or more RAN nodes. Thereafter, the processor is configured to transmit respective RAC value to each of the one or more RAN nodes, for configuring each of the one or more RAN nodes with the AMF.

In accordance with another aspect of the disclosure, an access and mobility management function (AMF) for notifying status of AMFs in a communication network is provided. The AMF from one or more AMFs of an AMF set includes a processor and a memory. The processor is configured to transmit a request to a network repository function (NRF) server, for status of other AMFs in the AMF set. The request comprises an identifier of the AMF set. The status may be one of a pre-defined status indicating failure/removal of the AMF in the AMF set or addition of an AMF to the AMF set. Further, the processor is configured to receive a notification indicating the status of the other AMFs in the AMF set, from the NRF server, in response to the request. Furthermore, the processor is configured to notify the status of at least one AMF from the other AMFs in the AMF set to one or more radio access network (RAN) nodes associated with the at least one AMF, when the status of the at least one AMF is one of a pre-defined status.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE ACCOMPANYING DRAWINGS

The above and other aspects, features, and advantages of certain embodiments of the disclosure will be more apparent from the following description taken in conjunction with the accompanying drawings, in which:

FIG. 1A illustrates an environment for managing radio access network (RAN) nodes in a communication network, according to an embodiment of the disclosure;

FIG. 1B illustrates an environment for notifying status of access and mobility management function (AMFs) in a communication network, according to an embodiment of the disclosure;

FIG. 2 illustrates a flowchart illustrating method operations for managing RAN nodes in a communication network, according to an embodiment of the disclosure;

Figure 3:
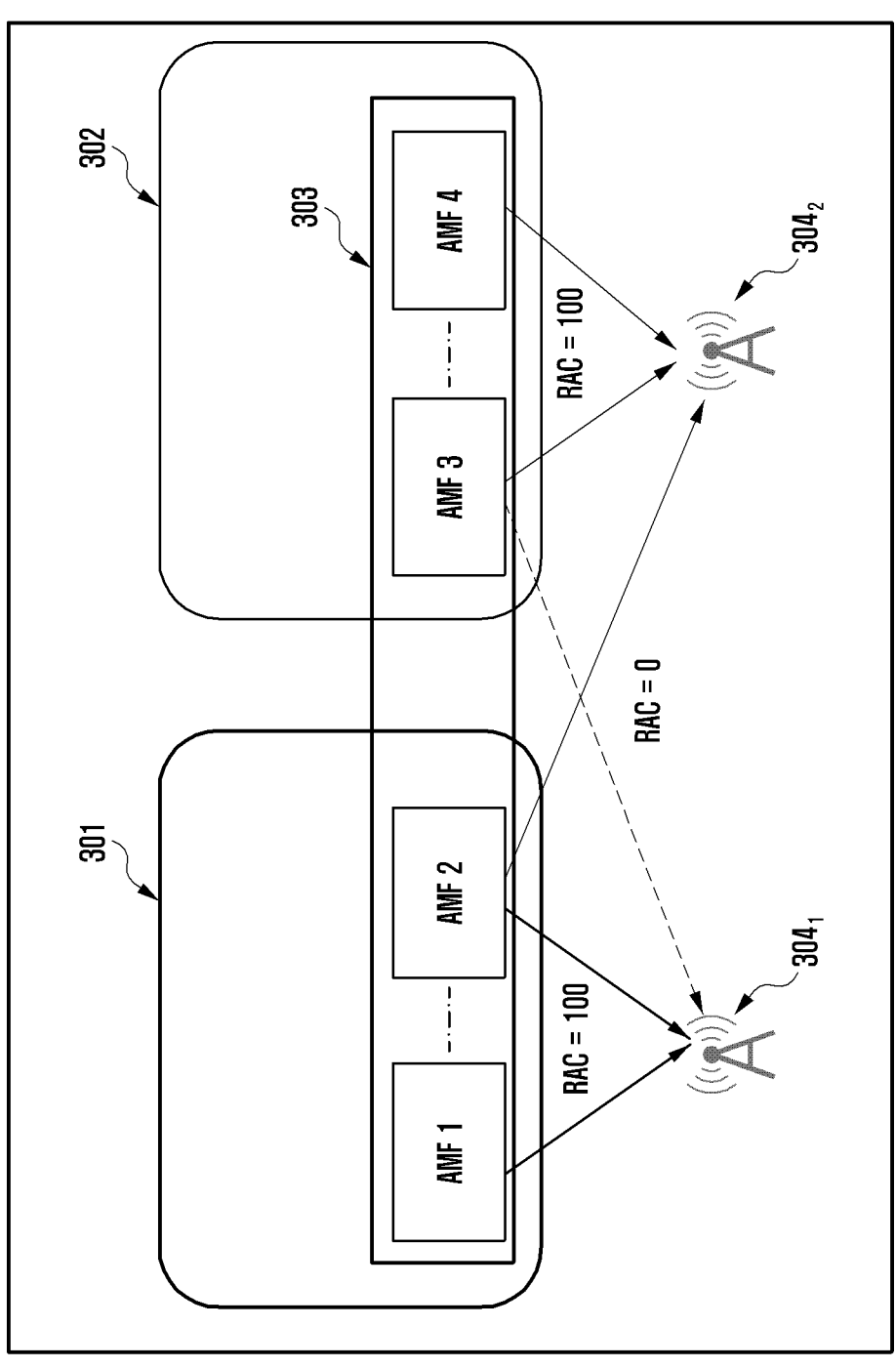
FIG. 3 shows illustration for managing RAN nodes in a communication network, according to an embodiment of the disclosure.

It should be appreciated by those skilled in the art that any block diagram herein represents conceptual views of illustrative systems embodying the principles of the subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the disclosure relate to a method for managing radio access network (RAN) nodes in a communication network. When RAN nodes are added to the communication network, each RAN node sends a tracking area identity (TAI) indicating locality of the RAN node to an access and mobility management function (AMF). The AMF is associated with an AMF set in an AMF region. The AMF determines whether the locality of each RAN node corresponds to primary serving localities or secondary serving localities of the AMF. The primary serving localities or secondary serving localities are identified based on a pre-stored TAI list. Further, the AMF identifies a relative AMF capacity (RAC) value for each RAN node. The RAC value of an AMF is defined as relative processing capacity of the AMF with respect to other AMFs in the AMF set, in order to load-balance AMFs within the AMF set. The RAC value is identified based on whether the locality of each RAN node corresponds to primary serving locality and secondary serving locality. The RAN nodes are configured with the AMF, by transmitting the respective RAC values. Hence, the disclosure provides methods for the AMFs to automatically configure the RAN nodes. Hence, the problems associated with manual configuration of RAN nodes is addressed. The disclosure ensures robustness and faster failure recovery of the AMFs in the AMF region. In addition, errors in configuration of the RAN nodes and maintaining a lengthy list of RAN node identifiers are avoided.

Further embodiments of the disclosure relate to a method of notifying status of the AMFs in the AMF set in the communication network. All the AMFs in an AMF set transmit a request to a network repository function (NRF) server, for monitoring other AMFs in the AMF set. The request includes an identifier of the AMF set. The NRF server monitors the AMF set with the identifier in the request. The AMFs in the AMF set receives a notification from the NRF server, indicating the status of the other AMFs in the AMF set. The status may be one of a pre-defined status indicating failure/removal of the AMF in the AMF set or addition of an AMF to the AMF set. Each AMF notifies the status of an AMF in the AMF set to RAN nodes associated with the AMF, when the status of the AMF is one of the pre-defined status. Hence, in the disclosure, the RAN nodes are notified of AMF failure, removal, or addition of the AMFs pro-actively. Hence, the time in RAN node contacting a new AMF or other AMF in the AMF set is reduced, thus ensuring a faster communication in case of AMF failure, removal, or addition.

Figure 1A:
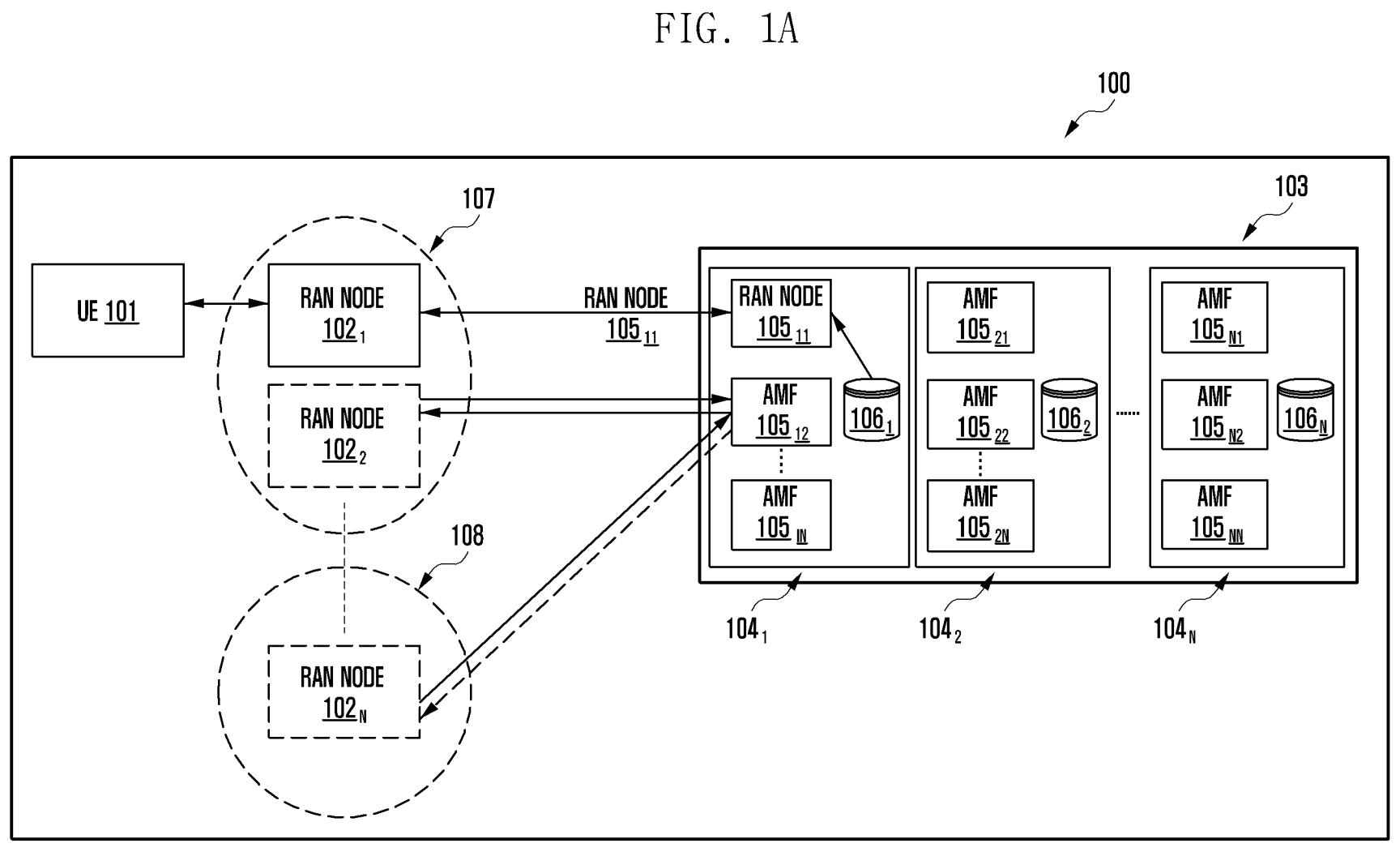

FIG. 1A illustrates an environment 100 for managing RAN nodes in a communication network, according to an embodiment of the disclosure.

Referring to FIG. 1A, the communication network comprises one or more AMFs of an AMF set in an AMF region. The environment 100 comprises a user equipment (UE) 101, one or more RAN nodes $102_1$, $102_2$, . . . , $102_N$, and an AMF region 103. The UE 101 may be a handheld device associated with a user. For example, the UE 101 may be a smartphone, a tablet, and the like. The 5G UE 101 may be any computing device, such as a laptop computer, a desktop computer, a personal computer (PC), a notebook, a smartphone, a tablet, e-book readers, a server, a network server, a cloud-based server, Internet of things (IoT) Device, vehicle, and the like. The UE 101 may communicate over a communication network with other UEs for using voice call services, video call services, messaging services, data services and the like. The communication network may be next generation e-NodeB (NG e-NodeB) network or a communication network working on 5G, Advanced 5G, $6^{th}$ generation (6G), or the like. The UE 101 connects to a core network via a radio access network (RAN) node. The RAN node may be in a hardware form or software form, any one of legacy base station, virtualized RAN (vRAN), cloud RAN, open RAN (ORAN), transmission point (TRP)/Multi-TRP based topology and the like. The communication network comprises multiple UEs which connect to the core network via one or more RAN nodes $102_1$, $102_2$, . . . , $102_N$.

FIG. 1A shows a single UE 101, for illustrative purposes only and should not be considered as limiting. Access and mobility management function (AMF) manages connection and mobility management for the UEs in the communication network. In a cloud native design principle, an AMF runs as a set of AMFs to provide a high level of redundancy. The AMF region 103 comprises a plurality of AMF sets $104_1$, $104_2$, . . . , $104_N$. Each AMF set from the plurality of AMF sets $104_1$, $104_2$, . . . , $104_N$ comprises one or more AMFs and a data storage.

Referring to FIG. 1A, it shows an AMF set $104_1$ comprising one or more AMFs $105_{11}$, $105_{12}$, . . . , $105_{1N}$ and a data storage $106_1$. An AMF set $104_2$ comprises one or more AMFs $105_{21}$, $105_{22}$, . . . , $105_{2N}$ and a data storage $106_2$. An AMF set $104_N$ comprises one or more AMFs $105_{N1}$, $105_{N2}$, . . . , $105_{NN}$ and a data storage $106_N$. The data storage $106_1$, $106_2$, . . . $106_N$ may store context of the UEs of respective AMF set from the plurality of AMF sets $104_1$, $104_2$, . . . , $104_N$. The one or more RAN nodes $102_1$, $102_2$, . . . , $102_N$ connects with the one or more AMFs $105_{11}$, $105_{12}$, . . . , $105_{1N}$, $105_{21}$, $105_{22}$, . . . , $105_{2N}$, . . . $105_{N1}$, $105_{N2}$, . . . , $105_{NN}$ to process a request from the UEs. For example, the UE 101 transmits a request for connection or a handover to a RAN node $102_1$. The RAN node $102_1$ routes the request to an AMF $105_{11}$ based on an identifier of the AMF $105_{11}$ in the request. The AMF $105_{11}$ receives the request and manages connection or handover for the UE 101.

The one or more RAN nodes $102_1$, $102_2$, . . . , $102_N$ are configured with the one or more AMFs $105_{11}$, $105_{12}$, . . . , $105_{1N}$, $105_{21}$, $105_{22}$, . . . , $105_{2N}$, . . . $105_{N1}$, $105_{N2}$, . . . , $105_{NN}$ to process a request from the UEs. Each of the one or more AMFs $105_{11}$, $105_{12}$, . . . , $105_{1N}$, $105_{21}$, $105_{22}$, . . . , $105_{2N}$, . . . $105_{N1}$, $105_{N2}$, . . . , $105_{NN}$ may be associated with one or more primary serving localities and one or more secondary serving localities. The one or more primary serving localities of an AMF may comprise localities served by the AMF. The one or more secondary serving localities of an AMF may comprise localities served by the AMF in certain scenarios, such as network failure, AMF failure, and the like. The AMF may be configured as a primary AMF for the one or more RAN nodes $102_1$, $102_2$, . . . , $102_N$ in the one or more primary serving localities of the AMF. The AMF may be configured as a secondary AMF for the one or more RAN nodes $102_1$, $102_2$, . . . , $102_N$ in the one or more secondary serving localities of the AMF. RAN nodes may be added or removed from the communication network. The AMF in an AMF set has to configure the added RAN node to process the UE context. In the description, the one or more AMFs $105_{11}$, $105_{12}$, . . . , $105_{1N}$ of the AMF set $104_1$ is considered hereafter, for explanation purpose only. The one or more AMFs $105_{11}$, $105_{12}$, . . . , $105_{1N}$ in the AMF set $104_1$ are also referred as the one or more AMFs 105 hereafter, in the description. An AMF from the one or more AMFs 105 in the AMF set $104_1$ configures the one or more RAN nodes $102_1$, $102_2$, . . . , $102_N$ added to the communication network.

Firstly, the AMF receives a tracking area identity (TAI) from each of the one or more RAN nodes added to the communication network. The TAI indicates a locality of each of the one or more RAN nodes. Further, the AMF determines whether the locality of each of the RAN nodes corresponds to one of, the one or more primary serving localities of the AMF and the one or more secondary serving localities of the AMF, based on a pre-stored TAI list. Furthermore, the AMF identifies a relative AMF capacity (RAC) value for each of the one or more RAN nodes. The RAC value is identified based on whether the locality corresponds to the one or more primary serving localities of the AMF and the one or more secondary serving localities of the AMF. Thereafter, the AMF transmits respective RAC value to each of the one or more RAN nodes, for configuring each of the one or more RAN nodes with the AMF. Consider that the RAN node $102_1$ is in a primary serving locality 107 of the AMF $105_{11}$ and is configured with the AMF $105_{11}$ to process the context of the UE 101. Further, a RAN node $102_2$ is added to the communication network. The RAN node $102_2$ is in the primary serving locality 107 of an AMF $105_{12}$. The AMF $105_{12}$ determines that the locality of the RAN node $102_2$ corresponds to the one or more primary localities of the AMF $105_{12}$, upon receiving the TAI from the RAN node $102_2$. The AMF $105_{12}$ configures the RAN node $102_2$ by transmitting an RAC value to the RAN node $102_2$. The RAC value may indicate that the AMF $105_{12}$ is a primary AMF to the RAN node $102_2$. Further, consider a RAN node $102_N$ is added to communication network. The RAN node $102_N$ is in a secondary locality 108 of an AMF $105_{12}$. The AMF $105_{12}$ determines that the locality of the RAN node $102_N$ corresponds to the one or more secondary localities of the AMF $105_{12}$, upon receiving the TAI from the RAN node $102_N$. The AMF $105_{12}$ configures the RAN node $102_N$ by transmitting an RAC value to the RAN node $102_N$. The RAC value may indicate that the AMF $105_{12}$ is a secondary AMF to the RAN node $102_2$. The one or more primary localities and the one or more secondary localities are referred as the one or more primary serving localities 107 and the one or more secondary localities 108 hereafter in the description.

Figure 1B:
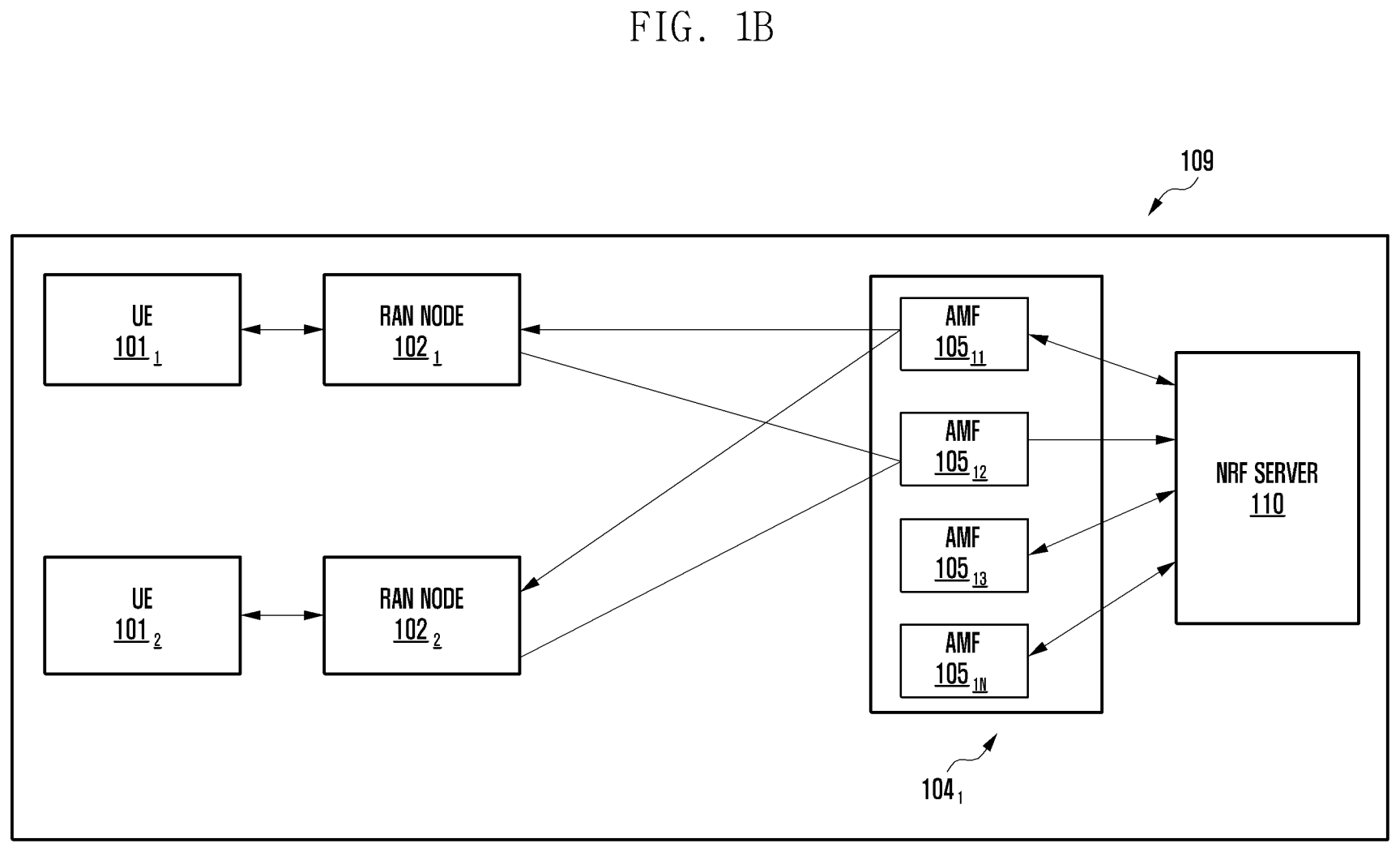

FIG. 1B illustrates an environment 109 for notifying status of AMFs in a communication network, according to an embodiment of the disclosure.

Referring to FIG. 1B, the communication network comprises one or more AMFs of an AMF set in an AMF region. The environment 109 comprises a UE $101_1$, a UE $101_2$, a RAN node $102_1$, a RAN node $102_2$, an AMF set $104_1$ comprising one or more AMFs $105_{11}$, $105_{12}$, $105_{13}$, . . . , $105_{1N}$, and a network repository function (NRF) server 110. The communication network comprises multiple UEs.

FIG. 1B shows only two UEs $101_1$, $101_2$, for illustrative purposes only and should not be considered as limiting. Each AMF in the AMF set $104_1$ may be associated with the one or more RAN nodes $102_1$, $102_2$, . . . , $102_N$, i.e., the one or more RAN nodes $102_1$, $102_2$, . . . , $102_N$ are connected RAN nodes to each AMF. Hence, the one or more RAN nodes $102_1$, $102_2$, . . . , $102_N$ needs to be notified, upon AMF failure, removal, or addition in the AMF set $104_1$.

An AMF from the one or more AMFs 105 of the AMF set $104_1$ is configured to transmit a request to the NRF server 110, for status of other AMFs in the AMF set $104_1$. The request comprises an identifier of the AMF set $104_1$. The NRF server 110 monitors each AMF in the AMF set $104_1$ using NRF heartbeat mechanism. In the NRF heartbeat mechanism, the NRF server 110 receives packets from each AMF continuously, which indicates operating condition of the AMF. When the NRF server 110 does not receive a packet from an AMF, the NRF server 110 detects a failure or removal of the AMF. Further, when a new AMF is added to the AMF set $104_1$, the new AMF may transmit an identifier of the new AMF to the NRF server 110. The NRF server 110 may detect the new AMF, based on the identifier of the new AMF. The AMF receives a notification indicating the status of the other AMFs in the AMF set, from the NRF server 110, in response to the request. Further, the AMF notifies the status of at least one AMF from the other AMFs in the AMF set to the one or more RAN nodes $102_1$, $102_2$, . . . , $102_N$ associated with the at least one AMF, when the status of the at least one AMF is one of a pre-defined status. The pre-defined status may indicate failure, removal, or addition in the AMF set $104_1$. In an example illustrated in FIG. 1B, each of the one or more AMFs $105_{11}$, $105_{12}$, $105_{13}$, . . . , $105_{1N}$ transmits the request to the NRF server 110. The NRF server 110 detects the failure of AMF $105_{12}$. The one or more AMFs 105 in the AMF set $104_1$ may receive the notification from the NRF server 110 indicating the status of the AMF $105_{12}$. The RAN nodes $102_1$ and $102_2$ may be associated with the AMF $105_{12}$. The one or more AMFs 105 may notify the status of the AMF $105_{12}$ to the RAN nodes $102_1$ and $102_2$. FIG. 1B shows an AMF $105_{11}$ notifying the status of the AMF $105_{12}$ to the RAN nodes $102_1$ and $102_2$. Similarly, the one or more AMFs other than the AMF $105_{12}$, for instance, AMF $105_{13}$, notifies the status of the AMF $105_{12}$ to the RAN nodes $102_1$ and $102_2$ (not shown in FIGS.). The one or more RAN nodes $102_1$, $102_2$, . . . , $102_N$ are also referred as the one or more RAN nodes 102 in the description.

FIG. 2 shows a flowchart illustrating method operations for managing one or more RAN nodes in a communication network according to an embodiment of the disclosure.

Referring to FIG. 2, a method 200 may comprise one or more operations. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 201, the AMF from the one or more AMFs of the AMF set 104₁ receives the TAI from each of the one or more RAN nodes 102 added to the communication network. The TAI is an identity used to identify a tracking area of a RAN node. The tracking area of the RAN node indicates a coverage area of the RAN node. The TAI of the RAN node is constructed from mobile country code (MCC), mobile network code (MNC) and tracking area code) (TAC). The TAI of each of the one or more RAN nodes 102 indicates a locality of each of the one or more RAN nodes. In an embodiment of the disclosure, when the one or more RAN nodes 102 are added to the communication network, each of the one or more RAN nodes 102 sends a TAI associated with corresponding RAN node. In another embodiment of the disclosure, a network operator may add the one or more RAN nodes 102 to the communication network and transmit a TAI list to the AMF. In an example, the network operator may remove existing RAN nodes from the communication network and add the one or more RAN nodes 102. In another example, the network operator may add the one or more RAN nodes to the communication network including the existing RAN nodes. The TAI list may comprise the TAI of each of the one or more RAN nodes 102 added to the communication network. The TAI may be received from the one or more RAN nodes 102 during new generation (NG) setup procedure. In the NG setup procedure, application-level data needed for configuration of each RAN node with the AMF is exchanged. Each RAN node may send the TAI in a NG setup request to the AMF. The AMF identifies the locality of each of the one or more RAN nodes 102 from the TAI.

FIG. 3 shows illustration for managing RAN nodes in a communication network, according to an embodiment of the disclosure.

Referring to FIG. 3, an AMF 1 receives the TAI from RAN nodes 304₁ and 304₂ added to the communication network. The AMF 1, AMF 2, AMF 3, and AMF 4 may be associated with the AMF region. The AMF 1 may identify the locality of the RAN node 304₁ as the locality 301. Further, the AMF 1 may identify the locality of the RAN node 304₂ as the locality 302. Similarly, AMF 2, AMF 3, and AMF 4 of an AMF set 303 may receive the TAI from the one or more RAN nodes 304₁ and 304₂. It should be noted that the AMF set 303 may comprise a large number of AMFs. FIG. 3 shows only four AMFs, for illustrative purposes only.

Referring back to FIG. 2, at operation 202, the AMF determines whether the locality of each of the one or more RAN nodes 102 corresponds to one of, the one or more primary serving localities 107 of the AMF and the one or more secondary serving localities 108 of the AMF. The AMF comprises a pre-stored TAI list. The pre-stored TAI list may comprise a first sub-list indicating the one or more primary serving localities 107 of the AMF and a second sub-list indicating the one or more secondary serving localities 108 of the AMF. In an embodiment of the disclosure, the pre-stored TAI list may comprise a range of TAIs defining the one or more primary serving localities 107 of the AMF and the one or more secondary serving localities 108 of the AMF. In an embodiment of the disclosure, the TAI list may be pre-stored in a memory of the AMF. In another embodiment of the disclosure, the TAI list may be pre-stored in a data storage from the data storages 106₁, 106₂, . . . , 106_N, corresponding to the AMF set associated with the AMF. The AMF determines whether the locality of each of the one or more RAN nodes 102 corresponds the one or more primary serving localities 107 or the one or more secondary serving localities 108 of the AMF based on the pre-stored list. The AMF may perform a one-to-one comparison between the locality of each of the one or more RAN nodes 102, and the one or more primary serving localities 107 and the secondary serving localities 108. The AMF may determine that the locality corresponds the one or more primary serving localities 107 or the one or more secondary serving localities 108 of the AMF based on the comparison. A person skilled in the art will appreciate that any methods other than the above-mentioned method may be used to determine whether the locality corresponds the one or more primary serving localities 107 or the one or more secondary serving localities 108 of the AMF, based on the pre-stored list. Referring again to the example 300 of FIG. 3, the AMF 1 may determine whether the locality of each of the RAN nodes 304₁ and 304₂ corresponds to the one or more primary serving localities 107 or the one or more secondary serving localities 108. The AMF 1 may determine that the locality of the RAN node 304₁ corresponds to a primary locality of the AMF 1. Further, the AMF 1 may determine that the locality of the RAN node 304₂ corresponds to a secondary locality of the AMF 1. Similarly, the AMF 2 may determine that the locality of the RAN node 304₁ and the RAN node 304₂ corresponds to a primary locality and a secondary locality of the AMF 2. This similar process is performed by AMF 3, AMF 4, and other AMFs in the AMF set 303.

Referring to FIG. 2, at operation 203, the AMF identifies the RAC value for each of the one or more RAN nodes 102. The RAC value helps in load balancing data traffic from the UEs across the AMFs. The RAC value identified for a RAN node from the one or more RAN nodes 102 indicates that the AMF is configured as a primary AMF for the RAN node, when the locality of the RAN node corresponds to the one or more primary serving localities 107 of the AMF. In an embodiment of the disclosure, the RAC value may be a first pre-defined value, indicating that the AMF is configured as the primary AMF for the RAN node. For example, the RAC value may be 100. In another embodiment of the disclosure, the RAC value may be a real-time value, when the locality of the RAN node corresponds to the one or more primary serving localities 107 of the AMF. The real-time value may be a vector comprising one or more values indicating a capacity of each of one or more primary AMFs from the one or more AMFs 105, to process context of the UE 101. In an embodiment of the disclosure, the RAC value is determined based on a current load of the AMF, number of AMFs in the AMF set, and the like. In another embodiment of the disclosure, the RAC value is manually provided by a network operator. A person skilled in the art will appreciate that the RAC value may be determined by any other known methods. For example, the locality of a RAN node may correspond to a primary locality of AMF 1 and AMF 2. Here, the AMF 1 and AMF 2 are the one or more primary AMFs for the RAN node. The data traffic of UEs via the RAN node needs to be distributed among the AMF 1 and AMF 2. The AMF 1 and the AMF 2 may determine the capacity of each of the AMF 1 and the AMF 2 as 60 and 40, respectively, on a scale of 0-100. The real-time value may be a vector comprising values 60 and 40 along with identifiers associated with the AMF 1 and AMF 2, respectively. The RAC value identified for a RAN node from the one or more RAN nodes 102 may indicate that the AMF is configured as a secondary AMF for the RAN node, when the locality of the RAN node corresponds to the one or more secondary serving localities 108 of the AMF. The RAC value may be a second pre-defined value, indicating that the AMF is configured as the secondary AMF for the RAN node. For example, the second pre-defined value may be 0. In a future instance, the RAN node may transmit a TAI for configuring with the secondary AMF, when a primary AMF configured with the RAN node is removed/failed. In such instance, the second pre-defined value may be re-configured to a value, after configuration with the secondary AMF. For example, the second pre-defined value may be 100. In another example, the second pre-defined value may be 60 based on load balancing among the AMFs in the AMF set. A person skilled in the art will appreciate that the RAC value is configurable as a pre-defined value, a real-time value, or any value, based on the implementation. Referring again to the example 300 in FIG. 3, the AMF 1 identifies the RAC value for the RAN node $304_1$ as 100. The AMF 2 identifies the RAC value for the RAN node $304_1$ as 100. Further, the AMF 2 identifies the RAC value for the RAN node $304_2$ as 0. Similarly, the AMF 3 identifies the RAC value for the RAN node $304_2$ as 100. The AMF 3 identifies the RAC value for the RAN node $304_1$ as 0. The AMF 4 identifies the RAC value for the RAN node $304_2$ as 100.

Referring to FIG. 2, at operation 204, the AMF transmits respective RAC value to each of the one or more RAN nodes 102. The AMF may include the respective RAC value of each of the one or more RAN nodes 102 in a NG setup response. Further, the AMF may transmit the NG setup response to each of the one or more RAN nodes 102, in response to the NG setup request from each of the one or more RAN nodes 102. The AMFs are configured with the one or more RAN nodes 102 as the primary AMFs or the secondary AMFs based on the identified RAC value. Referring again to the example 300 in FIG. 3, the AMF 1 and the AMF 2 are configured as the primary AMFs to the RAN node $304_1$. The AMF 3 and AMF 4 are configured as the secondary AMFs to the RAN node $304_2$.

Figure 4:
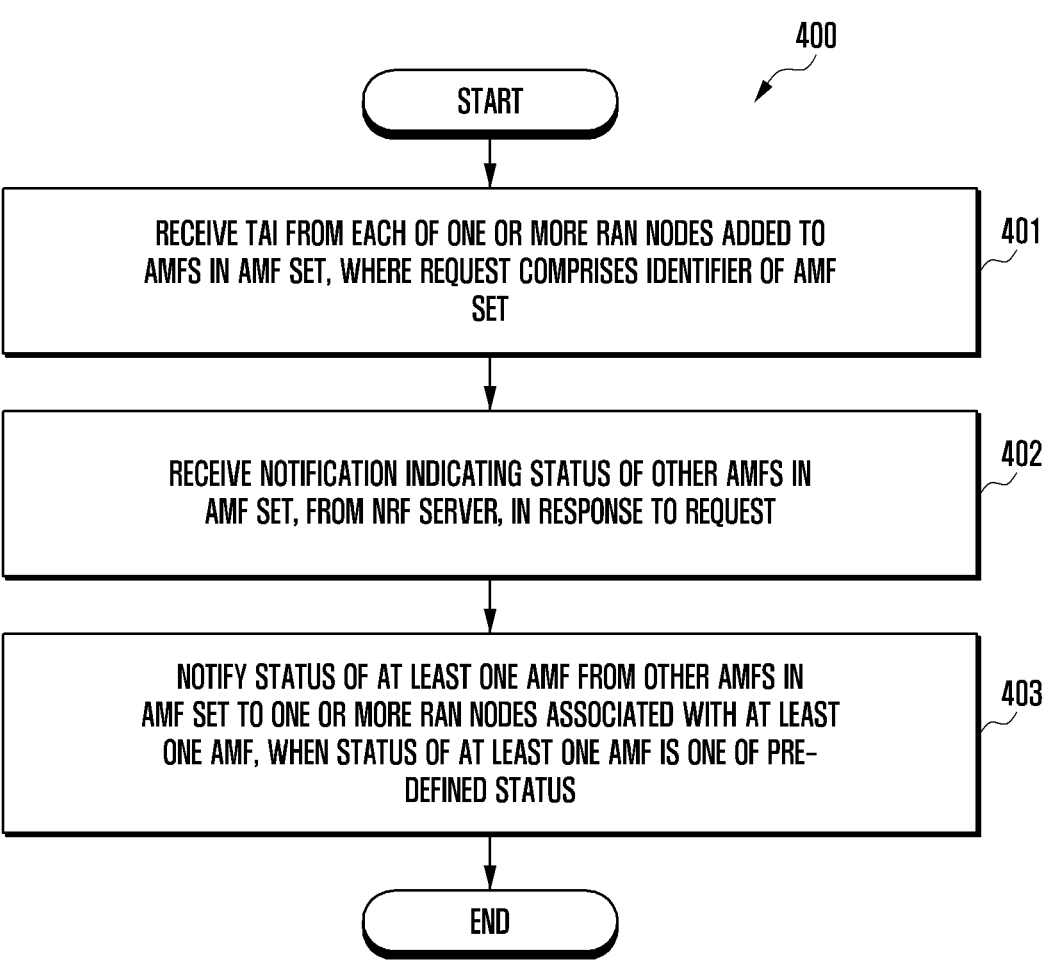
FIG. 4 illustrates a flowchart illustrating method operations for notifying status of AMFs in a communication network, according to an embodiment of the disclosure.

FIG. 4 shows a flowchart illustrating method operations for notifying status of AMFs in the communication network according to an embodiment of the disclosure.

Referring to FIG. 4, a method 400 may comprise one or more operations. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 401, the AMF from the one or more AMFs 105 of the AMF set $104_1$ transmits the request to the NRF server 110, for status of other AMFs in the AMF set $104_1$. The method is described by considering the AMF from the AMF set $104_1$. The method operations described in FIG. 4 are performed by each of the one or more AMFs of each of the plurality of AMF sets $104_1$, $104_2$, . . . $104_N$. Each of the plurality of AMF sets $104_1$, $104_2$, . . . $104_N$ registers or subscribes to the NRF server 110. The AMF may transmit the request to the NRF server 110, upon the registration. The request may comprise an identifier of the AMF set $104_1$. The AMF may determine the identifier of the AMF set $104_1$ from a unique identifier associated with the AMF. For example, the unique identifier is a globally unique AMF ID (GUAMI) associated with the AMF in a 5G communication network. In another example, the unique identifier is a GUAMI mapped with a long-term evolution (LTE) identifier (such as globally unique MME identifier) in an LTE communication network. The identifier of the AMF set associated with the AMF is a field in the unique identifier of the AMF. The NRF server 110 may continuously monitor the one or more AMFs 105 in the AMF set $104_1$, upon receiving the request from the AMF. The NRF server 110 may monitor the one or more AMFs 105 in the AMF set 104, using the NRF heartbeat mechanism. The NRF server 110 receives packets from the AMF continuously to monitor the one or more AMFs.

At operation 402, the AMF receives a notification indicating the status of the other AMFs in the AMF set $104_1$, from the NRF server 110, in response to the request. The NRF server 110 may not receive a packet from an AMF. The NRF server 110 detects a failure or removal of the AMF. Further, when a new AMF is added to the AMF set $104_1$, the new AMF may transmit an identifier of the new AMF to the NRF server 110. The NRF server 110 may detect the new AMF, based on the identifier of the new AMF. The NRF server 110 may detect the new AMF by comparing the identifier with stored list of identifiers of the one or more AMFs 105 (existing AMFs). The NRF server 110 may provide the notification indicating the status of the other AMFs in the AMF set $104_1$.

At operation 403, the AMF notifies the status of at least one AMF from the other AMFs in the AMF set $104_1$ to the one or more RAN nodes 102 associated with the at least one AMF. The one or more RAN nodes 102 may be connected RAN nodes of the AMF. The one or more RAN nodes 102 may comprise the RAN nodes for which the AMF is serving as a primary AMF or a secondary AMF. The AMF may notify the status of the at least one AMF from the other AMFs, when the status of the at least one AMF is one of a pre-defined status. The pre-defined status of the at least one AMF includes one of, failure of the at least one AMF and removal of the at least one AMF from the AMF set $104_1$. Further, the at least one AMF may be a new AMF added to the AMF set $104_1$, wherein the pre-defined status of the at least one AMF includes addition of the at least one AMF to the AMF set $104_1$. The AMF may receive an acknowledgement from each of the one or more RAN nodes 102, upon notifying the status of the at least one AMF. Further, each AMF in the AMF set $104_1$ other than the at least one AMF may notify the status of the at least one AMF. A single acknowledgement may be received from each of the one or more RAN nodes 102, when the one or more AMFs 105 other than the at least one AMF notifies same status of the at least one AMF. The one or more RAN nodes 102 do not send the acknowledgment all the AMFs in the AMF set $104_1$, once the one or more RAN nodes 102 sends the acknowledgement to the AMF (first AMF in the AMF set $104_1$ notifying the status). This saves time and processing capacity in sending the acknowledgement to all the AMFs. The one or more RAN nodes 102 selects AMFs other than the at least one AMF, when the status of the at least one AMF indicates one of, failure and removal of the at least one AMF. The one or more RAN nodes 102 selects the AMFs for transmitting context of the UE 101 in the communication network. The one or more RAN nodes 102 selects the at least one AMF, when the status of the at least one AMF indicates addition of the at least one AMF, for transmitting context of the UE 101.

Figure 5A:
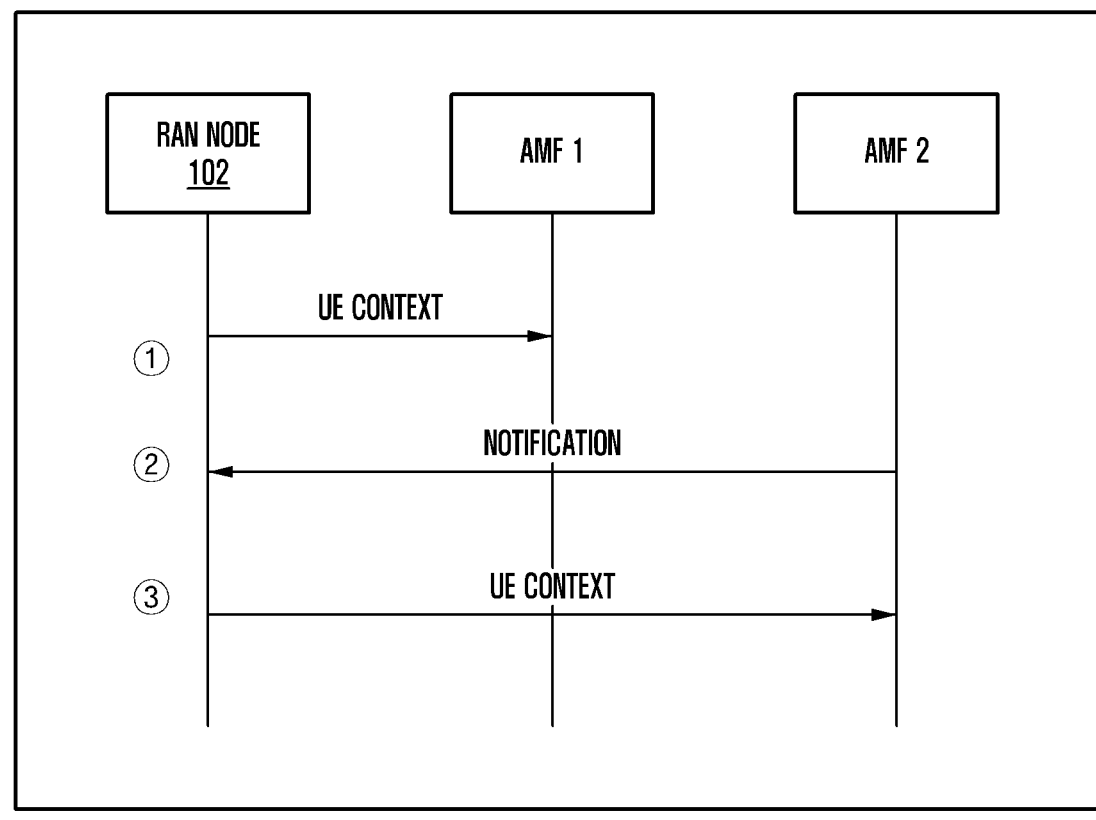
FIGS. 5A and 5B show illustrations for notifying status of AMFs in a communication network, according to various embodiments of the disclosure.
Figure 5B:
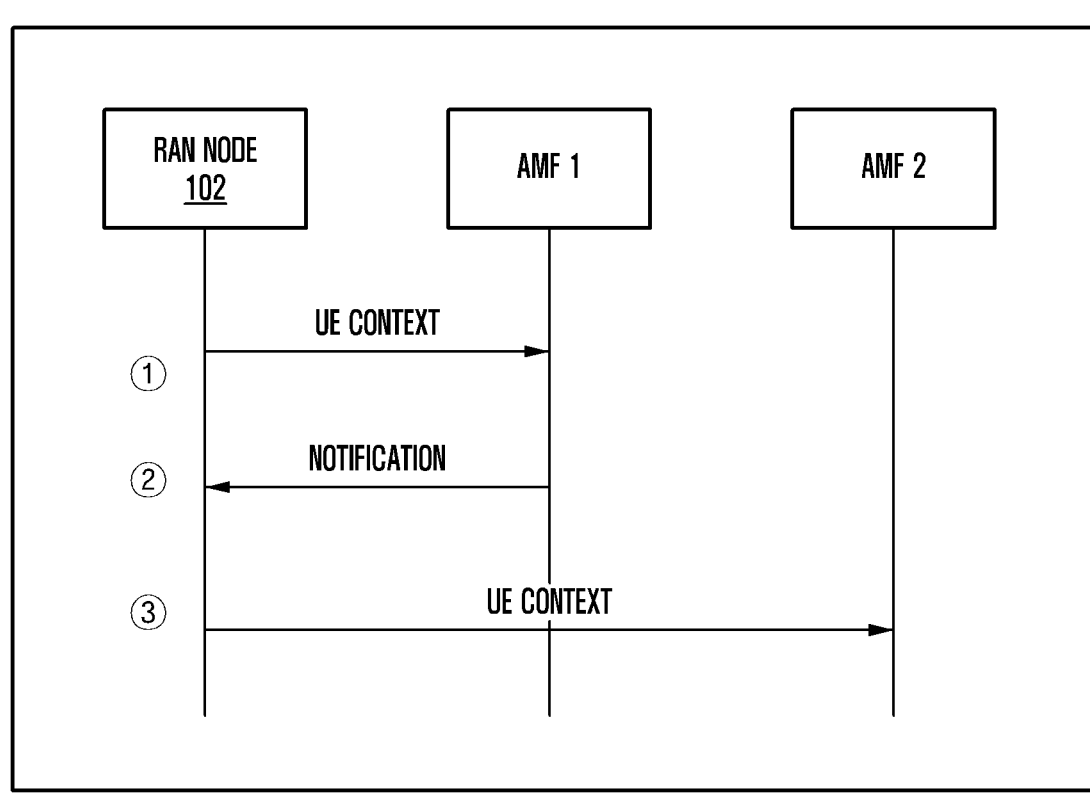

FIGS. 5A and 5B show illustrations for notifying status of AMFs in a communication network according to various embodiments of the disclosure.

Referring to example 500 in FIG. 5A, at operation 1, the RAN node 102 transmits the context of the UE 101 to AMF 1. The AMF 1 may be in a non-operating condition. At operation 2, the AMF 2 notifies the status of the AMF 1 to the RAN node 102, indicating the failure of the AMF 1. At operation 3, the RAN node 102 may transmit the context of the UE 101 to AMFs other than the AMF 1, in an AMF set associated with the AMF 1. FIG. 5A illustrates the RAN node 102 transmitting the context of the UE 101 to the AMF 2.

Referring to example 501 in FIG. 5B, the RAN node 102 transmits the context of the UE 101 to AMF 1. The AMF 1 notifies the status of a new AMF added to the AMF set, to the RAN node 102. At operation 3, the RAN node 102 may transmit the context of the UE 101 to the new AMF. The RAN node 102 may transmit the context of the UE 101 to the new AMF for load balancing between the AMFs in the AMF set.

Figure 6:
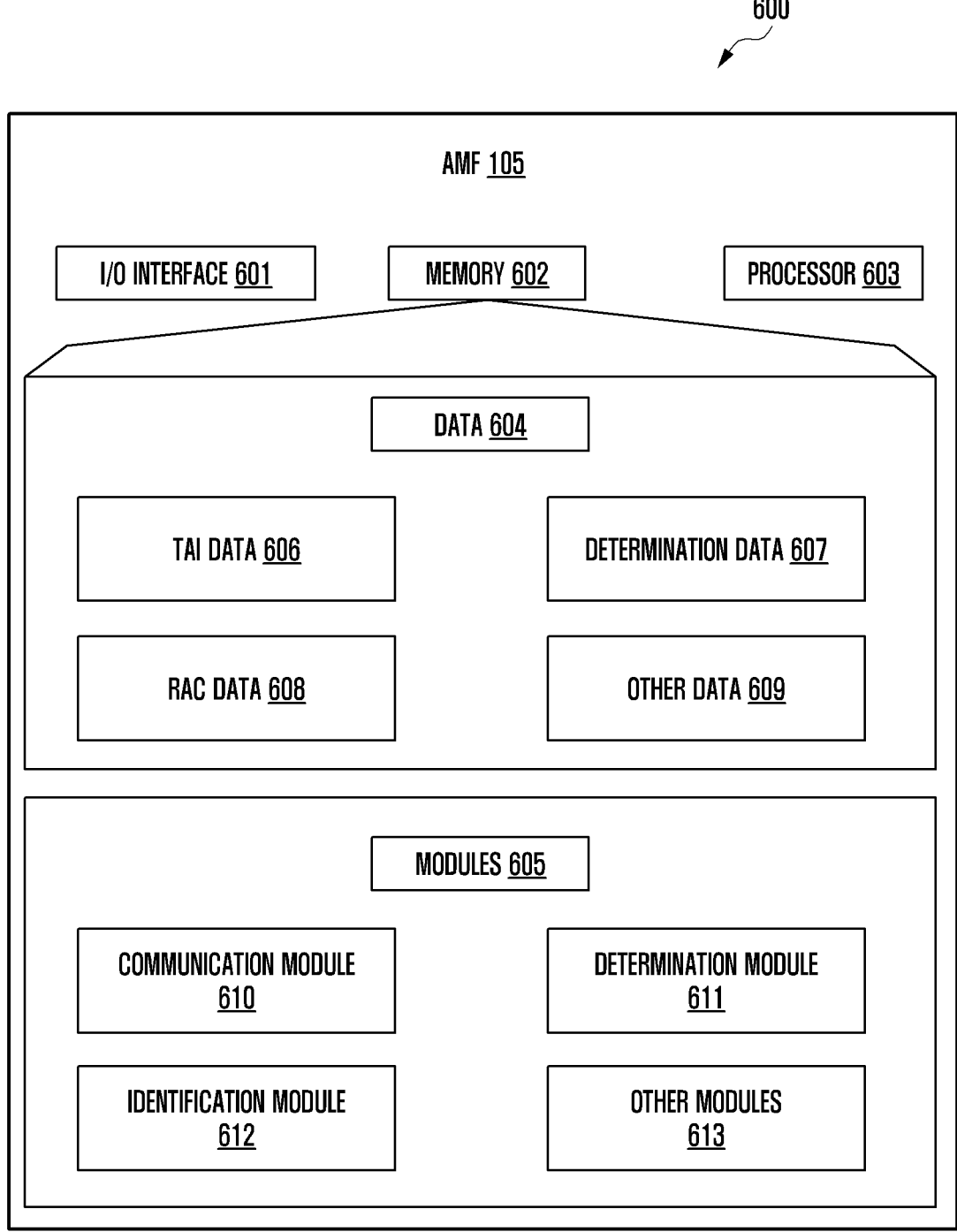
FIG. 6 illustrates an internal architecture of an AMF for managing RAN nodes in a communication network, according to an embodiment of the disclosure.

FIG. 6 illustrates an internal architecture 600 of an AMF for managing RAN nodes 102 in a communication network 103, according to an embodiment of the disclosure.

Referring to FIG. 6, the internal architecture 600 is applicable for each AMF in the one or more AMFs in each of the plurality of sets 104. Hence, the AMF is also referred as the AMF 105 in explanation of the internal architecture 600.

The AMF 105 may include central processing units 603 (also referred as "CPUs" or "a processor 603"), an input/output (I/O) interface 601, and a memory 602. In some embodiments of the disclosure, the memory 602 may be communicatively coupled to the processor 603. The memory 602 stores instructions executable by the processor 603, which, on execution, may cause the processor 603 to configure the RAN nodes 102 with the AMF in the AMF region 103. In an embodiment of the disclosure, the memory 602 may include one or more modules 605 and data 604. The one or more modules 605 may be configured to perform the operations of the disclosure using the data 604. In an embodiment of the disclosure, each of the one or more modules 205 may be a hardware unit which may be outside the memory 602 and coupled with the AMF 105. As used herein, the term modules 605 refers to an application specific integrated circuit (ASIC), an electronic circuit, a field-programmable gate arrays (FPGA), programmable system-on-chip (PSoC), a combinational logic circuit, and/or other suitable components that provide described functionality. The one or more modules 605 when configured with the described functionality defined in the disclosure will result in a novel hardware. Further, the I/O interface 601 is coupled with the processor 603 through which an input signal or/and an output signal is communicated.

In one implementation, the modules 605 may include, for example, a communication module 610, a determination module 611, an identification module 612, and other modules 613. It will be appreciated that such aforementioned modules 605 may be represented as a single module or a combination of different modules. In one implementation, the data 604 may include, for example, TAI data 606, determination data 607, RAC data 608, and other data 609.

In an embodiment of the disclosure, the communication module 610 may be configured to receive the TAI from each of the one or more RAN nodes 102 added to the communication network. The TAI of each of the one or more RAN nodes 102 indicates the locality of each of the one or more RAN nodes. Each RAN node may send the TAI in a setup request to the communication module 610. The TAI of each of the one or more RAN nodes 102 may be stored as the TAI data 606 in the memory 602.

In an embodiment of the disclosure, the determination module 611 may be configured to receive the TAI data 606 from the communication module 610. The determination module 611 determines whether the locality of each of the one or more RAN nodes 102 corresponds to one of, the one or more primary serving localities 107 and the one or more secondary serving localities 108 of the AMF 105, based on the pre-stored TAI list. In an embodiment of the disclosure, the TAI list may be pre-stored in the memory 602 of the AMF 105, for efficient processing. In another embodiment of the disclosure, the TAI list may be pre-stored in a data storage from the data storages 106₁, 106₂, . . . , 106_N, corresponding to the AMF set associated with the AMF 105, for improved resiliency. Data related to the determination of whether the locality corresponds to one of, the one or more primary serving localities 107 and the one or more secondary serving localities 108 of the AMF 105 may be stored as the determination data 607 in the memory 602.

In an embodiment of the disclosure, the identification module 612 may be configured to receive the determination data 607 from the determination module 611. The identification module 612 identifies the RAC value for each of the one or more RAN nodes 102, based on the determination data 607. The RAC value identified for a RAN node from the one or more RAN nodes 102 indicates that the AMF 105 is configured as a primary AMF for the RAN node, when the locality of the RAN node corresponds to the one or more primary serving localities 107 of the AMF 105. The RAC value may be the first pre-defined value or the real-time value, indicating that the AMF is configured as the primary AMF for the RAN node. The RAC value identified for a RAN node from the one or more RAN nodes 102 may indicate that the AMF is configured as a secondary AMF for the RAN node, when the locality of the RAN node corresponds to the one or more secondary serving localities 108 of the AMF 105. The RAC value may be a second pre-defined value, indicating that the AMF 105 is configured as the secondary AMF for the RAN node. The RAC values identified for each of the one or more RAN nodes 102 may be stored as the RAC data 608 in the memory 602.

In an embodiment of the disclosure, the communication module 610 may be further configured to receive the RAC data 608 from the identification module 612. The communication module 610 transmits the setup response including the RAC value to each of the one or more RAN nodes 102, for configuring the one or more RAN nodes 102 with the AMF 105.

The other data 609 may store data, including temporary data and temporary files, generated by the one or more modules 605 for performing the various functions of the AMF 105. The other data 609 may be stored in the memory 602. The one or more modules 605 may also include the other modules 613 to perform various miscellaneous functionalities of the AMF 105. It will be appreciated that the one or more modules 605 may be represented as a single module or a combination of different modules.

Figure 7:
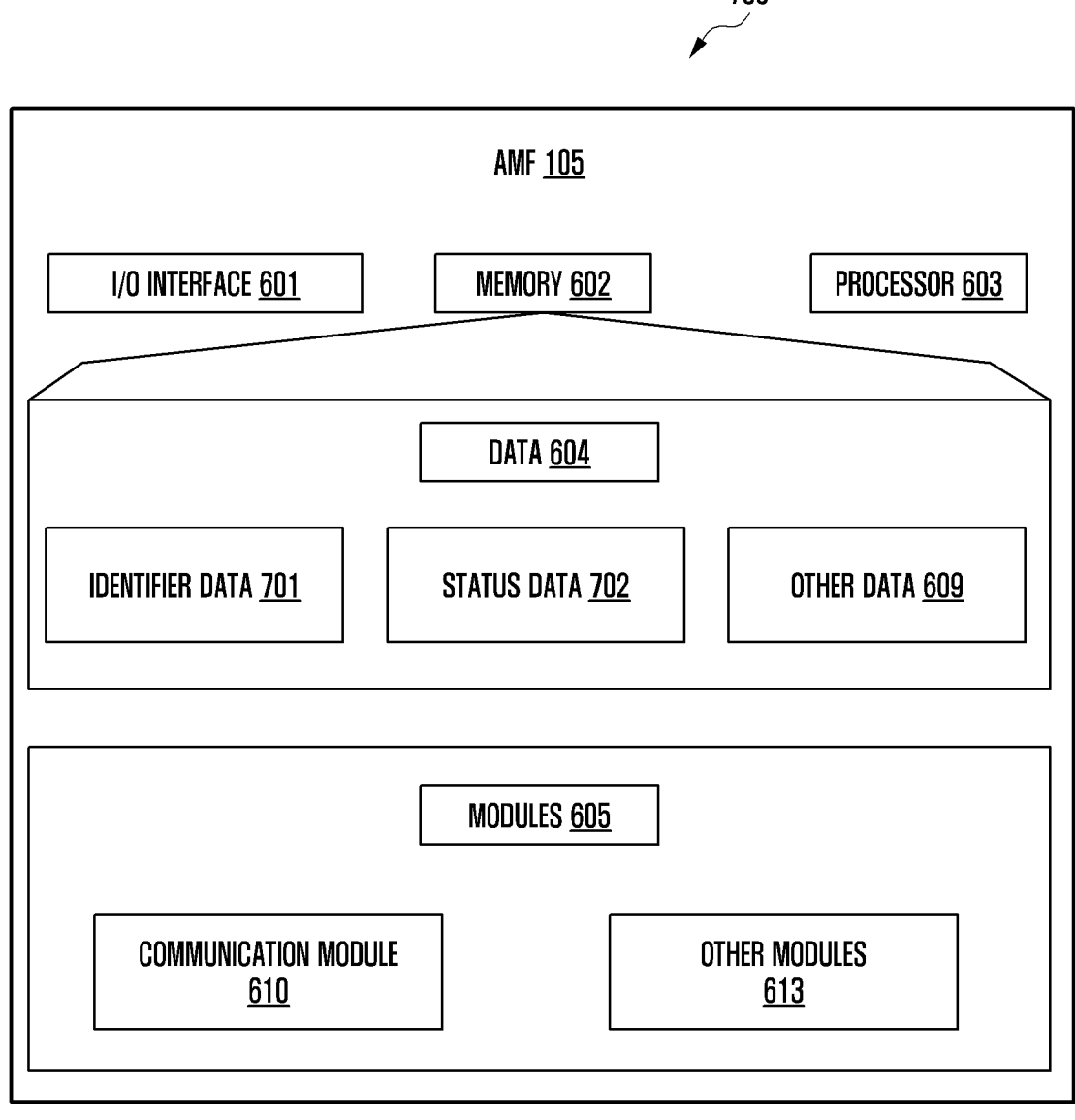
FIG. 7 illustrates an internal architecture of an AMF for notifying status of AMFs in a communication network, according to an embodiment of the disclosure.

FIG. 7 illustrates an internal architecture 700 of an AMF for notifying status of AMFs in a communication network, according to an embodiment of the disclosure.

Referring to FIG. 7, in one implementation, the modules 605 of the AMF 105 may include, for example, a communication module 610 and other modules 613. It will be appreciated that such aforementioned modules 605 may be represented as a single module or a combination of different modules. In one implementation, the data 604 may include, for example, identifier data 701, status data 702, and other data 609.

In an embodiment of the disclosure, the communication module 610 may be configured to transmit the request to the NRF server 110, for status of other AMFs in the AMF set $104_1$. The request may comprise the identifier of the AMF set $104_1$. The identifier of the AMF set $104_1$ may be stored as the identifier data 701 in the memory 602. Further, the communication module 610 may be configured to receive the notification indicating the status of the other AMFs in the AMF set $104_1$, from the NRF server 110. The status of the other AMFs may be stored as the status data 702 in the memory 602. Furthermore, the AMF may be configured to notify the status of at least one AMF from the other AMFs in the AMF set $104_1$ to the one or more RAN nodes 102 associated with the at least one AMF.

The disclosure provides methods for the AMFs to automatically configure the RAN nodes. Hence, the problems associated with manual configuration of RAN nodes is addressed. The disclosure ensures robustness and faster failure recovery of the AMFs in the AMF region. In addition, errors in configuration of the RAN nodes and maintaining a lengthy list of RAN node identifiers is avoided.

The disclosure enables seamless addition or removal of the RAN nodes, without any manual intervention in the AMFs.

In the disclosure, the RAN nodes are notified of AMF failure, removal, or addition of the AMFs pro-actively. Hence, the time in RAN node contacting a new AMF or other AMF in the AMF set is reduced, thus ensuring a faster communication in case of AMF failure, removal, or addition.

In the disclosure, the AMF in the AMF set can be seamlessly treated as interchangeable mobility management node, since the failure or removal is notified pro-actively. This provides seamless restoration of context of a UE and hence add service continuity to network. Further, the network operator can choose to provide geo-redundancy per PLMN or at slice level granularity.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 2 and 4 show certain events occurring in a certain order. In alternative embodiments of the disclosure, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing radio access network (RAN) nodes by an access and mobility management function (AMF) in a communication network, the method comprising:

receiving a tracking area identity (TAI) from each of one or more RAN nodes added to the communication network, wherein the TAI indicates a locality of each of the one or more RAN nodes;

performing a comparison between the locality of each of the one or more RAN nodes and entries in a pre-stored TAI list comprising one or more primary serving localities and one or more secondary serving localities of the AMF;

determining, based on the comparison, whether the locality of each of the one or more RAN nodes corresponds to one of, the one or more primary serving localities of the AMF or one of the one or more secondary serving localities of the AMF;

identifying a relative AMF capacity (RAC) value for each of the one or more RAN nodes; and transmitting respective RAC value to each of the one or more RAN nodes, for configuring each of the one or more RAN nodes with the AMF, wherein the AMF is one of AMFs included in an AMF set.

2. The method of claim 1, wherein the AMF set is associated with an AMF region comprising a plurality of AMF sets, and wherein each of the plurality of AMF sets comprises the one or more AMFs.

3. The method of claim 1, wherein the pre-stored TAI list comprises:

a first sub-list indicating the one or more primary serving localities of the AMF; and a second sub-list indicating the one or more secondary serving localities of the AMF.

4. The method of claim 1, wherein the RAC value identified for a RAN node from the one or more RAN nodes is one of, a first pre-defined value or a real-time value, indicating that the AMF is configured as a primary AMF for the RAN node, when the locality of the RAN node corresponds to the one or more primary serving localities of the AMF.

5. The method of claim 1, wherein the RAC value identified for a RAN node from the one or more RAN nodes is a second pre-defined value indicating that the AMF is configured as a secondary AMF for the RAN node, when the locality of the RAN node corresponds to the one or more secondary serving localities of the AMF.

6. The method of claim 4, wherein the real-time value is a vector comprising one or more values indicating a capacity of each of one or more primary AMFs from the one or more AMFs, to process context of a user equipment (UE) associated with the RAN node.

7. An access and mobility management function (AMF) for managing radio access network (RAN) nodes in a communication network, the AMF comprising:

a processor; and a memory storing processor-executable instructions, which, on execution, causes the processor to:

receive a tracking area identity (TAI) from each of one or more RAN nodes added to the communication network, wherein the TAI indicates a locality of each of the one or more RAN nodes, perform a comparison between the locality of each of the one or more RAN nodes and entries in a pre-stored TAI list comprising one or more primary serving localities and one or more secondary serving localities of the AMF;

determine, based on the comparison, whether the locality of each of the one or more RAN nodes corresponds to one of, the one or more primary serving localities of the AMF or one of the one or more secondary serving localities of the AMF, identify a relative AMF capacity (RAC) value for each of the one or more RAN nodes, and transmit respective RAC value to each of the one or more RAN nodes, for configuring each of the one or more RAN nodes with the AMF, wherein the AMF is one of AMFs included in an AMF set.

8. The AMF of claim 7, wherein the AMF set is associated with an AMF region comprising a plurality of AMF sets, and wherein each of the plurality of AMF sets comprises the one or more AMFs.

9. The AMF of claim 7, wherein the pre-stored TAI list comprises:

a first sub-list indicating the one or more primary serving localities of the AMF; and a second sub-list indicating the one or more secondary serving localities of the AMF.

10. The AMF of claim 7, wherein the RAC value identified for a RAN node from the one or more RAN nodes is one of, a first pre-defined value or a real-time value, indicating that the AMF is configured as a primary AMF for the RAN node, when the locality of the RAN node corresponds to the one or more primary serving localities of the AMF.

11. The AMF of claim 7, wherein the RAC value identified for a RAN node from the one or more RAN nodes is a second pre-defined value indicating that the AMF is configured as a secondary AMF for the RAN node, when the locality of the RAN node corresponds to the one or more secondary serving localities of the AMF.

12. The AMF of claim 10, wherein the real-time value is a vector comprising one or more values indicating a capacity of each of one or more primary AMFs from one or more AMFs, to process context of a user equipment (UE) associated with the RAN node.

\* \* \* \* \*